United States Patent [19]

Schmidt et al.

[11] Patent Number: 4,555,075
[45] Date of Patent: Nov. 26, 1985

[54] DUAL MODE SEAT BELT RETRACTOR ASSEMBLY

[75] Inventors: Timothy J. Schmidt, Troy; Ronald A. Heintzleman, Sterling Heights, both of Mich.

[73] Assignee: General Safety Corporation, St. Clair Shores, Mich.

[21] Appl. No.: 711,319

[22] Filed: Mar. 13, 1985

[51] Int. Cl.$^4$ .................. A62B 35/02; B65H 75/48
[52] U.S. Cl. ........................................... 242/107.4 A
[58] Field of Search ............. 242/107.4 A, 107.4 R, 242/107.4 B–107.4 E, 107.6, 107.7; 280/806; 297/478

[56] References Cited

U.S. PATENT DOCUMENTS 4,436,255  3/1984  Matsui et al. .............. 242/107.4 A Primary Examiner—John M. Jillions
Attorney, Agent, or Firm—Harness, Dickey & Pierce

[57] ABSTRACT

A dual mode seat belt retractor assembly particularly useful for motor vehicles is described. The seat belt retractor according to this invention converts between an emergency locking retractor which locks only when the vehicle is subjected to a deceleration level above a predetermined level to an automatic locking mode wherein withdrawal of webbing from the retractor is inhibited. An automatic locking retractor is advantageous for firmly positioning child restraint systems. The emergency locking retractor, however, has advantages in terms of occupant comfort and convenience for adult occupants since they provide freedom of movement within the vehicle. In accordance with this invention, the retractor is converted between automatic locking and emergency locking operating modes through rotation of a drive plate which moves an actuator lever between two positions of engagement with an actuator cam rotatable with the retractor spool. One position permits normal operation of the retractor as an emergency locking retractor while another provides automatic locking operation.

10 Claims, 10 Drawing Figures

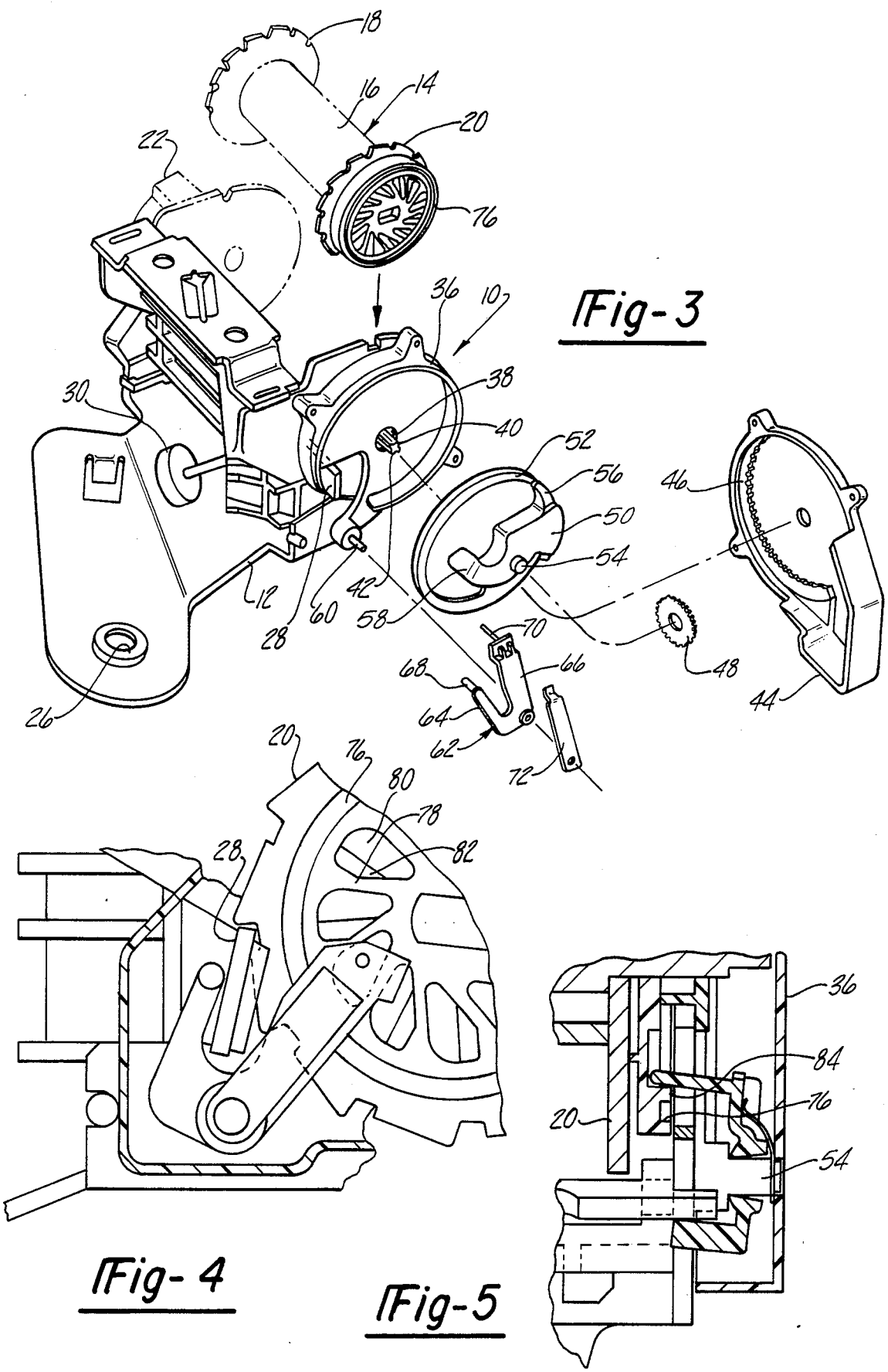

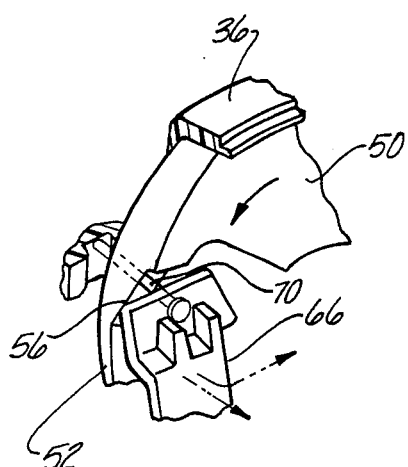
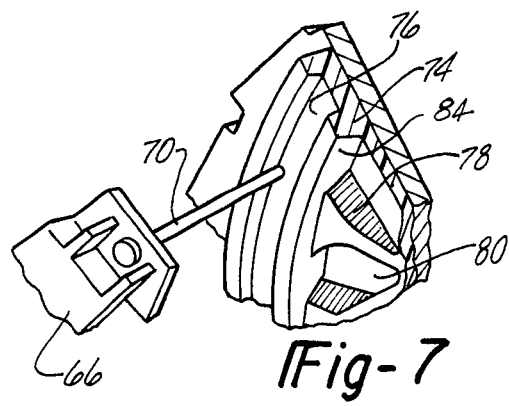
Fig-6
Fig-7
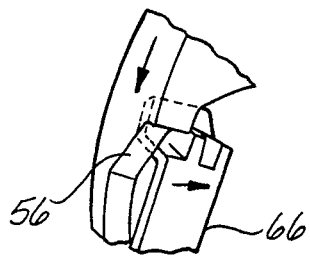
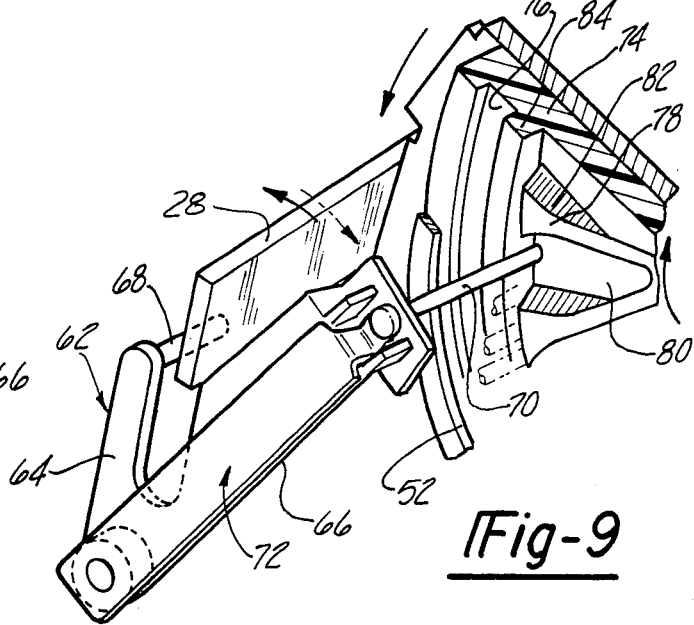
Fig-8
Fig-9
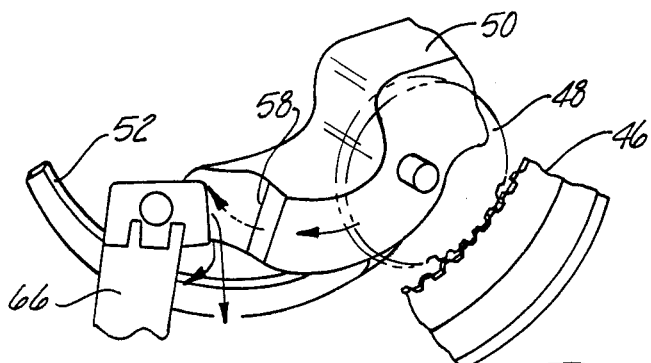
Fig-10

DUAL MODE SEAT BELT RETRACTOR ASSEMBLY

BACKGROUND AND SUMMARY OF THE INVENTION

This invention relates to a motor vehicle seat belt retractor and particularly to a retractor which can be operated both as an emergency locking retractor or an automatic locking retractor.

Most motor vehicles are equipped with seat belt systems which act to restrain the occupants when the vehicle is subjected to high rates of deceleration which may occur, for example, during a collision. Many seat belt retractors are of the so-called emergency locking variety. These retractors employ an inertia sensitive actuator which prevents seat belt webbing from being withdrawn from the retractor when the vehicle is subjected to deceleration forces above a predetermined level, thereby restraining the vehicle occupant. During normal operating circumstances, however, the seat belt webbing may be freely withdrawn from the retractor, providing freedom of movement of the occupants.

Another type of seat belt retractor is often referred to as an automatic locking retractor. When using these retractors, the seat belt webbing is fully withdrawn from the retractor and, as webbing is thereafter retracted, a locking bar engages sprockets within the retractor thus preventing withdrawal. These retractors therefore act as a one-way clutch once the webbing is fully withdrawn, permitting webbing to be retracted within the retractor but not withdrawn. When, however, the seat belt is unfastened and the webbing is fully retracted within the retractor, the webbing can again be withdrawn to the desired extent. These types of retractors tend to firmly restrain the occupant since webbing cannot be withdrawn and therefore restrict freedom of movement of the occupant.

The emergency locking retractor design has many advantages in terms of occupant comfort and convenience, since they permit free movement of the occupants until deceleration forces above a predetermined level are sensed. Emergency locking retractors, however, have been found undesirable when used to fasten a child restraint system within the vehicle. For this application, it is preferred that the seat belt system firmly and securely anchor the child restraint system to the vehicle. Since automatic locking retractors do not permit free withdrawal of webbing, they are preferable for anchoring a child restraint system within the vehicle.

Due to the conflicting needs to provide adult occupant comfort and convenience, and the need to securely fasten child restraint systems within vehicles, it is desirable to provide a dual mode seat belt retractor assembly which may be converted between emergency locking and automatic locking operation in accordance with the needs of the user. It is therefore a principal object of this invention to provide such a dual mode seat belt retractor. It is a further object of this invention to provide a dual mode retractor which is easily switched between operational modes. It is yet another object of this invention to provide a dual mode seat belt retractor which is simple in design and inexpensive. It is yet another object of this invention to provide a dual mode retractor having an automatic locking mechanism which is independent of the emergency locking inertia actuator, thereby not adversely affecting reliability of the emergency locking feature of the retractor.

The above principal objects of this invention are achieved by providing a seat belt retractor having an actuator cam attached to the rotating retractor spool. An actuator lever is employed which engages the actuator cam in one position to urge the locking bar into engagement with the toothed sprockets of the retractor spool to provide automatic locking operation, and is disengageable with the cam to provide emergency locking operation. The actuator lever is moved between these two operational mode positions through rotation of a drive plate which includes a pair of cam surfaces which urges the actuator lever between the operational positions. The drive plate is caused to rotate by locating an idler gear thereon which is caused to rotate around a retractor shaft gear and meshes with the retractor shaft gear and a fixed ring gear. The drive plate is arranged so that the retractor switches to automatic locking mode when the webbing is nearly fully withdrawn from the retractor. The retractor returns to emergency locking retractor once webbing is fully retracted.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is an exploded pictorial view of the dual mode retractor assembly according to this invention;

FIG. 4 is an enlarged partial side view particularly showing the actuator lever and its interaction with the locking bar and actuator cam components;

FIG. 5 is a frontal sectional view of the actuator lever and actuator cam according to this invention;

FIG. 6 is a partial pictorial view of the actuator lever in a position wherein the retractor functions as an emergency locking retractor;

FIGS. 7 and 8 are partial pictorial views showing the interaction between the drive plate and locking lever which switches the retractor from the emergency locking mode to automatic locking operation;

FIG. 9 is a partial pictorial view of the retractor in automatic locking operation showing the position of the locking lever engaging the cam surface of the actuator cam; and FIG. 10 is a partial pictorial view showing another cam surface of the drive plate urging the locking lever to return to emergency locking operation.

DETAILED DESCRIPTION OF THE INVENTION

Figure 1:
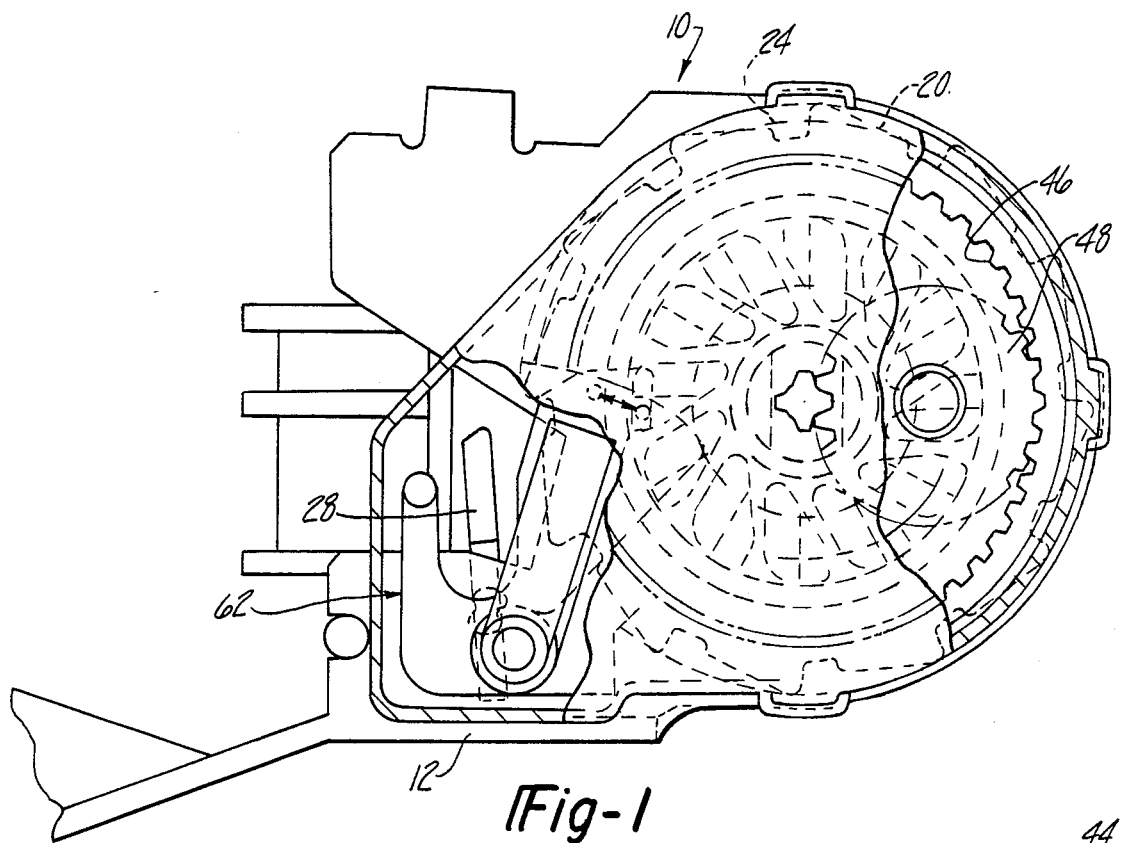
FIG. 1 is a side elevational view, partially in section, of the dual mode retractor according to this invention.

A dual mode seat belt retractor assembly according to this invention is shown in the figures and is generally designated by reference character 10. Retractor assembly 10 includes retractor frame 12 to which rotatable spool 14 is mounted. Spool 14 includes a belt support shaft 16 terminating laterally in a pair of radially extending toothed sprockets 18 and 20. Torsion spring assembly 22 acts upon belt support shaft 16 to rotatably bias spool 14 so that a belt webbing retracting force is applied when webbing is withdrawn from retractor 10.

Figure 2:
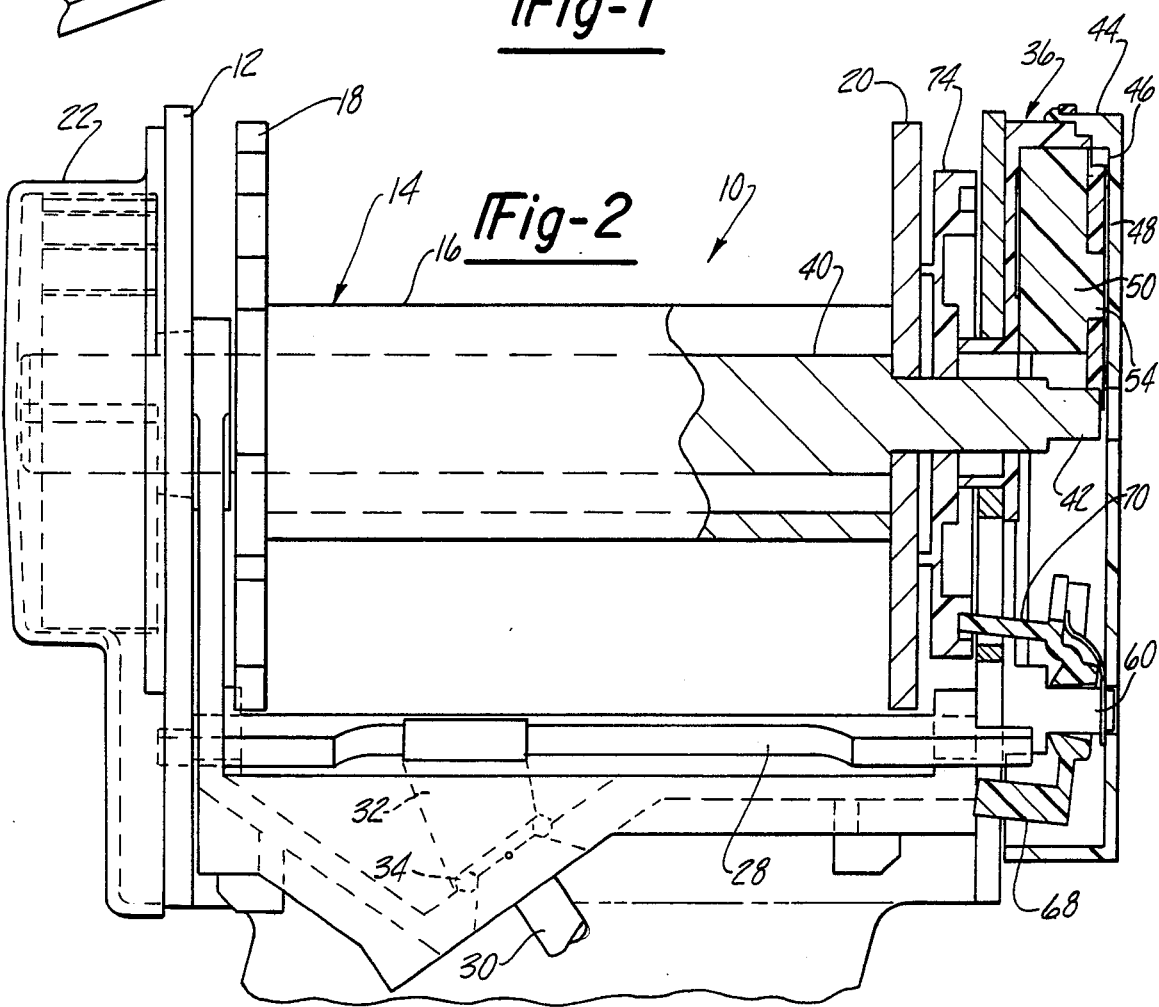
FIG. 2 is a frontal elevational view, partially in section, of the dual mode retractor assembly.

One end of seat belt webbing 24 is attached to belt support shaft 16 and becomes rolled onto spool 14 as it is rotated. Retractor frame 12 includes one or more mounting holes 26 for fasteners which permit secure attachment of retractor 10 to the associated vehicle. Locking bar 28, particularly shown by FIGS. 1 and 2, is movable between a normal position to an engaging position wherein the locking bar engages one of the teeth of toothed sprockets 18 and 20. Locking bar 28 is caused to move between these positions by inertia sensitive actuator 30 acting on lever 32 which is clipped onto locking bar 28. Actuator 30 includes a disc 34 which contacts lever 32 when the actuator moves to a tilted position once retractor assembly 10 (and the associated motor vehicle) undergoes deceleration above a predetermined level (or when the retractor is tilted from its installed position). Once actuator 30 is caused to move to a tilted position, locking bar 28 is urged into engagement with sprockets 18 and 20 due to contact between disc 34 and lever 32. Once engagement between locking bar 28 and sprockets 18 and 20 occurs, withdrawal of webbing 24 is inhibited.

A gear housing 36 is attached to a portion of retractor frame 12 and surrounds central bore 38 through which retractor shaft 40 extends. The end of retractor shaft 40 extending outside of retractor frame 12 has teeth forming retractor shaft gear 42. Gear housing cover 44 becomes fastened to gear housing 36 and includes ring gear insert 46 which is bonded to or formed integrally with gear housing cover 44. Ring gear insert 46 is arranged concentrically around retractor shaft gear 42. Idler gear 48 meshes with ring gear insert 46 and retractor shaft gear 42 such that, as webbing 24 is withdrawn from retractor assembly 10, idler gear 48 is caused to orbit about the center of rotation of spool 14. Drive plate 50 is installed within gear housing 36 and includes outer ring portion 52, idler gear pivot post 54 and a pair of cam surfaces 56 and 58. Cam surface 56 is located at a radially outward position as compared with cam surface 58.

Gear housing 36 further includes actuator lever pivot post 60. Actuator lever 62 is pivotably attached to post 60 and includes a pair of arms 64 and 66. Arm 64 includes an axially extending post 68 which is engageable with locking bar 28 and arm 66 includes a post 70. Actuator lever 62 is movable about pivot post 60 between positions of engagement and disengagement of post 68 with locking bar 28. Actuator lever cantilever type spring 72 exerts force on arm 66 in a direction parallel to the axis of rotation about pivot post 60.

Actuator cam 74 is fixed to toothed sprocket 20 and is rotatable therewith and defines a radially outer idle track 76 in the form of a concentric groove as best shown in FIGS. 3, 5 and 6. Radially inboard of idle track 76 is a plurality of radially projecting teeth 78 with pockets 80 therebetween. As shown best in FIG. 4, teeth 78 are swept in a counterclockwise direction. Ramp 82 forms a smooth transition between the floor surface of pocket 80 to the top surface of teeth 78. Concentric wall 84 separates idle track 76 from pockets 80.

Actuator lever 62 is movable between two positions. In one position of lever 62, retractor 10 functions as an emergency locking retractor therefore preventing webbing withdrawal in response to vehicle deceleration. In another position of lever 62, the retractor functions as an automatic locking retractor which prevents withdrawal of webbing. FIGS. 4 and 5 depict the position of the elements when retractor 10 is operating in the automatic locking retractor mode. As shown in FIG. 4, as actuator cam 74 is rotated in a clockwise direction when webbing is being retracted, post 70 is caused to move from pocket 80 to ramp 82 to the top surface of teeth 78 and thereafter drops into an adjacent pocket 80. If, however, actuator cam 74 is rotated in a counterclockwise direction which corresponds to the direction of rotation which occurs upon belt extension, post 70 rides along the inside edge border between pocket 80 and teeth 78 and is urged in a radially inward direction due to the swept configuration of the teeth. Such radially inward displacement causes post 68 to bear against locking bar 28 thereby urging it into engagement with toothed sprockets 18 and 20. In this configuration, therefore, retractor 10 functions as an automatic locking retractor since belt retraction is permitted yet belt withdrawal is inhibited.

Another displaced position for actuator lever 62 is shown in FIGS. 1, 6 and 7. In this position, post 70 is riding within idle track 76 and post 68 is displaced such that it does not act upon locking bar 28. In this position, therefore, retractor 10 functions as an emergency locking retractor such that webbing withdrawal is prevented only upon sensing a vehicle deceleration above a predetermined level which causes inertia actuator 30 to initiate engagement between bar 28 and sprockets 18 and 20.

The action of switching between the above-described positions which causes a change in the mode of operation of retractor 10 will now be described with reference to FIGS. 6 through 10. FIG. 6 depicts the position of the elements in the emergency locking retractor mode wherein post 70 is riding in idle track 76. Upon a sufficient level of webbing 24 withdrawal, spool 14 is caused to rotate a sufficient amount to cause drive plate 50 to be rotated to a position where cam surface 56 engages arm 66 of actuator lever 62 as shown in FIG. 7. As shown by that figure, cam surface 56 contacts arm 66 at a point adjacent post 70 thereby forcing arm 66 to be displaced axially outward and radially inward. This urging occurs until arm 66 deforms through flexure to the extent that post 70 moves over wall 84 and into engagement with teeth 78, thereby moving actuator lever 62 into the position shown in FIGS. 4, 5, 8 and 9. If, however, webbing is returned onto retractor spool 14, drive plate 50 is caused to rotate in a clockwise direction until cam surface 58 acts on actuator lever arm 66. As shown in FIG. 10, cam surface 58 acts on lever 62 such that it is lifted axially and radially outward thereby moving post 70 past wall 84 and into idle track 76 and returning retractor 10 to the emergency locking operation mode.

In order to provide a convenient means for selecting the operational mode of retractor 10 and switching between modes, it is desirable to provide a number of teeth on retractor shaft gear 42, idler gear 48, and ring gear insert 46 such that webbing 24 is nearly fully withdrawn from spool 14 when the retractor switches to the automatic locking mode. Similarly, retractor 10 is preferably returned back to emergency locking operation upon full retraction of webbing 24. This operational scheme enables the belt to be used by most adults as an emergency locking retractor. If, however, the user wishes to restrain a child restraint system or otherwise desires automatic locking operation, the webbing is first completely withdrawn from retractor 10 thereby switching to automatic locking operation and then fastened around the occupant or child restraint system.

While the above description constitutes the preferred embodiments of the present invention, it will be appreciated that the invention is susceptible to modification, variation and change without departing from the proper scope and fair meaning of the accompanying claims.

What is claimed is:

1. A seat belt retractor which may be operated either as an emergency locking retractor which prevents seat belt webbing from being withdrawn when said retractor is subjected to deceleration above a predetermined level, or as an automatic locking retractor which acts to retract said webbing but inhibits webbing withdrawal, comprising;
a retractor frame,
a spool rotatably attached to said frame for winding said webbing, said spool having at least one toothed sprocket,
a locking bar mounted to said frame and movable between a position of engagement with said toothed sprocket thereby inhibiting withdrawal of said webbing to a position of disengagement with said toothed sprocket thereby permitting withdrawal of said webbing,
an inertia sensitive actuator acting upon said locking bar in response to a deceleration level above a predetermined threshold,
an actuator cam rotatable with said sprocket, said actuator cam defining a plurality of teeth extending generally radially with respect to the axis of rotation of said sprocket,
an actuator lever having a pair of arms, a first arm engageable with said locking bar and a second arm engageable with said actuator cam teeth, and
means for moving said actuator lever between a position wherein said second arm is disengaged with said cam teeth causing said first arm to be disengaged from said locking bar whereby said retractor functions as an emergency locking retractor, to a position wherein said second arm is engaged with said cam teeth, said cam teeth acting on said second arm, causing said first arm to engage with said locking bar and urge said locking bar into engagement with said toothed sprocket when said webbing is withdrawn whereby said retractor functions as an automatic locking retractor.

2. The seat belt retractor according to claim 1 wherein said means for moving said actuator lever between said positions comprises;
a retractor shaft having a toothed end defining a retractor shaft gear,
a ring gear fixed to said retractor frame and concentrically positioned around said retractor shaft gear,
an idler gear meshing with said ring gear and said retractor shaft gear,
a drive plate having a pivot for rotatably mounting said idler gear such that said drive plate rotates as said retractor shaft is rotated, said drive plate defining first and second cam surfaces, said firt cam surface engaging said actuator lever second arm urging said actuator lever to a position of disengagement with said cam teeth when said drive plate is in a first predetermined angular position with respect to said retractor frame whereby said retractor functions as an emergency locking retractor, said second cam surface engaging said actuator lever second arm and urging said actuator lever to a position of engagement with said actuator cam when said drive plate is in a second predetermined angular position with respect to said retractor frame whereby said retractor functions as an automatic locking retractor.

3. The seat belt retractor according to claim 1 wherein said actuator lever second arm includes a post member which engages said actuator cam teeth.

4. The seat belt retractor according to claim 1 wherein said actuator cam further defines an idle track which receives said actuator lever second arm when said actuator lever is disengaged from said cam teeth and said locking bar.

5. The seat belt retractor according to claim 1 wherein said actuator cam teeth are swept such that retraction of the webbing causes said actuator lever second arm to be biased radially inwardly thereby causing said actuator lever first arm to urge said locking bar into engagement with said toothed sprocket.

6. The seat belt retractor according to claim 2 wherein said predetermined angular position occurs when the webbing is substantially completely retracted within the retractor.

7. The seat belt retractor according to claim 2 wherein said second predetermined angular position occurs when the webbing is substantially completely withdrawn from the retractor.

8. The seat belt retractor according to claim 1 wherein said actuator cam further defines a pocket between each of said teeth and a ramp surface transitioning between said pockets and said teeth such that when said second arm is engaged with said actuator cam, said actuator lever second arm moves in engagement with one of said pockets, to said ramp, to said tooth and adjacent of said pockets as said webbing is retracted into said retractor.

9. A seat belt retractor which may be operated either as an emergency locking retractor which prevents seat belt webbing from being withdrawn when said retractor is subjected to deceleration above a predetermined level, or as an automatic locking retractor which acts to retract said webbing but inhibits webbing withdrawal, comprising;
a retractor frame,
a spool rotatable within said frame for winding said webbing, said spool having at least one toothed sprocket,
a locking bar mounted to said frame movable between a position of engagement with said toothed sprocket thereby inhibiting withdrawal of said webbing to a position of disengagement with said toothed sprocket thereby permitting withdrawal of said webbing,
an inertia sensitive actuator acting upon said locking bar in response to a deceleration level above a predetermined threshold causing said locking bar to engage said toothed sprocket thereby inhibiting withdrawal of said webbing,
an actuator cam rotatable with said sprocket, said actuator cam defining a plurality of axially projecting teeth extending generally radially, said teeth separated by pockets with a ramp surface transitioning between said pockets and said teeth, said actuator cam further defining an annular idle track groove encircling said teeth,
an actuator lever pivotably attached to said retractor frame having a first arm engageable with said locking bar for urging said locking bar into engagement with said toothed sprocket, said actuator lever further having a second arm engageable with said actuator cam teeth and said idle track, a retractor shaft rotatable with said spool, said retractor shaft defining a toothed end, a ring gear fixed to said retractor frame and concentrically positioned around said retractor shaft toothed end, an idler gear meshing with said ring gear and said retractor shaft toothed end, a drive plate disposed within said ring gear for relative rotation therein having a pivot for said idler gear such that said drive plate rotates as said spool rotates, said drive plate having first and second cam surfaces, said first cam surface engaging said actuator lever second arm when said webbing is substantially retracted within said retractor urging said actuator lever second arm into engagement with said idle track causing said first actuator lever arm to a position of disengagement with said locking bar whereby said retractor functions as an emergency locking retractor, said second cam surface engaging said actuator lever second arm when said webbing is substantially withdrawn from said retractor, urging said actuator lever second arm into a position of engagement with said actuator cam teeth such that as said webbing is retracted into said retractor, said second arm moves from contact with said actuator cam pocket, up said ramp surface and over said tooth into another of said pockets, and when said webbing is withdrawn from said retractor, said second arm contacts said actuator cam teeth and is urged radially inwardly causing said actuator lever first arm to urge said locking bar into engagement with said toothed sprocket whereby said retractor functions as an automatic locking retractor.

10. The seat belt retractor according to claim 9 wherein said actuator lever second arm includes a post member which engages said actuator cam teeth.

* * * *